June 24, 1941.  K. BRENKERT  2,246,970
FILM PRESSER PAD ASSEMBLY
Original Filed Jan. 21, 1939  2 Sheets-Sheet 1
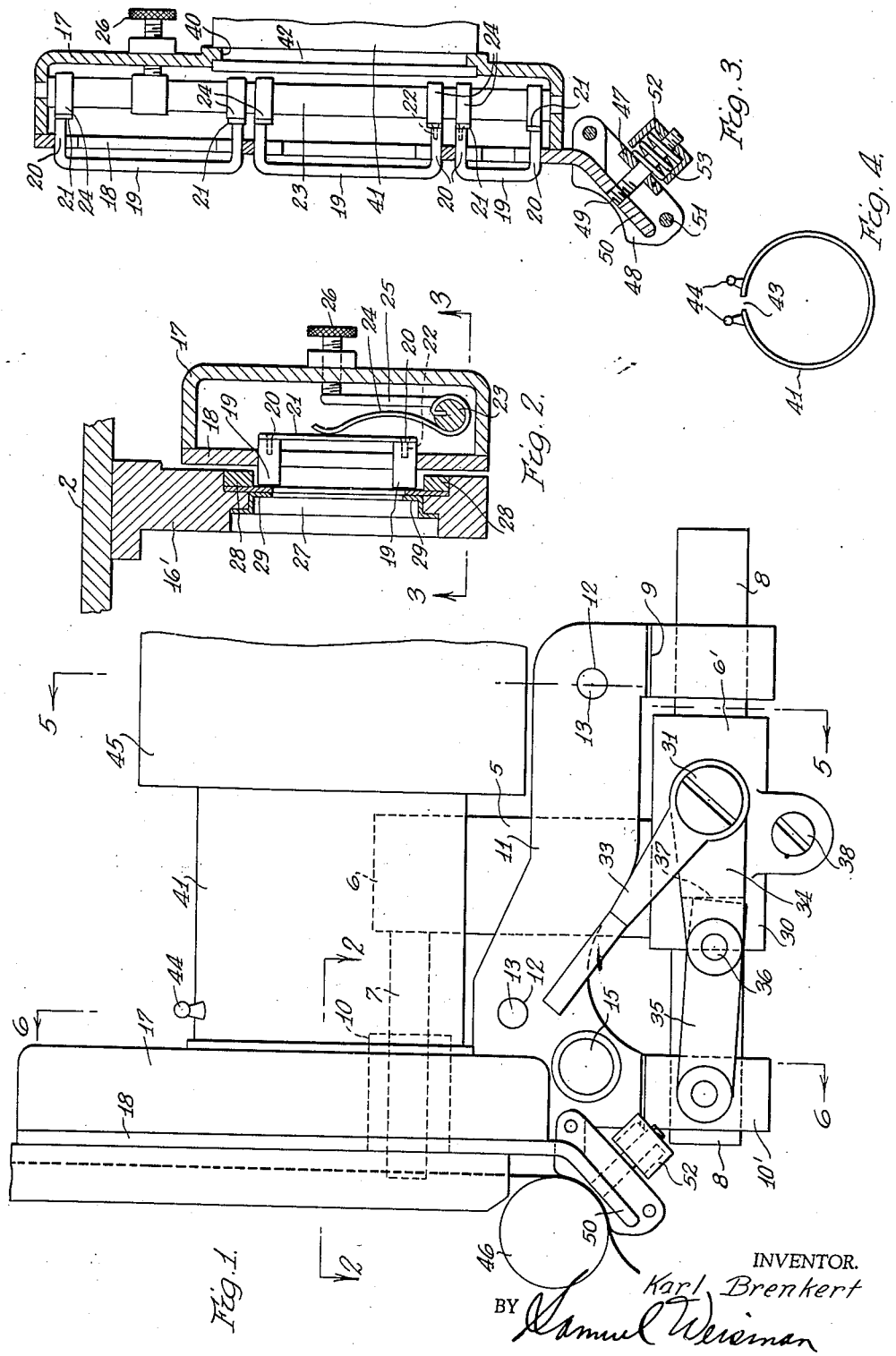
INVENTOR.
Karl Brenkert
BY Samuel Weisman June 24, 1941.　　　K. BRENKERT　　　2,246,970
FILM PRESSER PAD ASSEMBLY
Original Filed Jan. 21, 1939　　2 Sheets-Sheet 2

INVENTOR.
Karl Brenkert
BY Samuel Wiseman

Patented June 24, 1941

2,246,970

UNITED STATES PATENT OFFICE 2,246,970

FILM PRESSER PAD ASSEMBLY

Karl Brenkert, Detroit, Mich., assignor to Brenkert Light Projection Company, Detroit, Mich., a corporation of Michigan Original application January 21, 1939, Serial No. 252,149. Divided and this application May 24, 1939, Serial No. 275,425

6 Claims. (Cl. 88—17)

This application is a division of my co-pending application Serial No. 252,149 filed January 21, 1939, which has resulted in Patent No. 2,204,884 of June 18, 1940.

The invention pertains to the pads or shoes carried by the film gate for resiliently engaging the rear surface of the film as it travels along the aperture plate.

The pads are provided in pairs above and below the projection aperture as well as at the aperture, to hold the film flat before reaching and after leaving aperture, to ensure the desired flat condition at the aperture. Although the pads cover a substantial length of film, a thick splice in the film will not disturb the frame at the aperture until engaging the pads at opposite sides of the aperture, since the latter are separate from the pads above and below the aperture.

The pads are backed by springs, and it is the object of the invention to provide a means for simultaneously adjusting the tension of the several springs by a simple manipulation. Within the scope of the invention, the pads need not be located with respect to the projection aperture in the manner described.

More specifically, the separate pads are engaged by leaf springs anchored to a common rod journaled in the body. The angular position of the rod determines the tension of the springs. The position of the rod, and hence the tension of the springs, is regulated by a means of a set screw bearing against an arm or lever extending from the rod.

The invention is fully disclosed by way of example in the following description and in the accompanying drawings in which:

Figure 1 is a side elevation of the gate assembly;

Figure 2 is a section on the line 2—2 of Figure 1;

Figure 3 is a vertical section on the line 3—3 of Figure 2;

Figure 4 is a detail end view of the lens tube;

Reference to these views will now be made by use of like characters which are employed to designate corresponding parts throughout.

Figure 6:
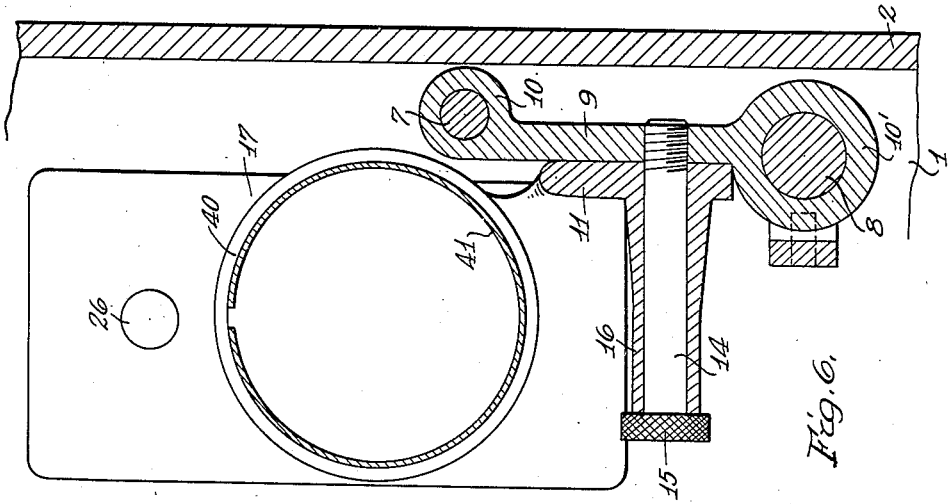
Figure 6 is a section on the line 6—6 of Figure 1.
Figure 5:
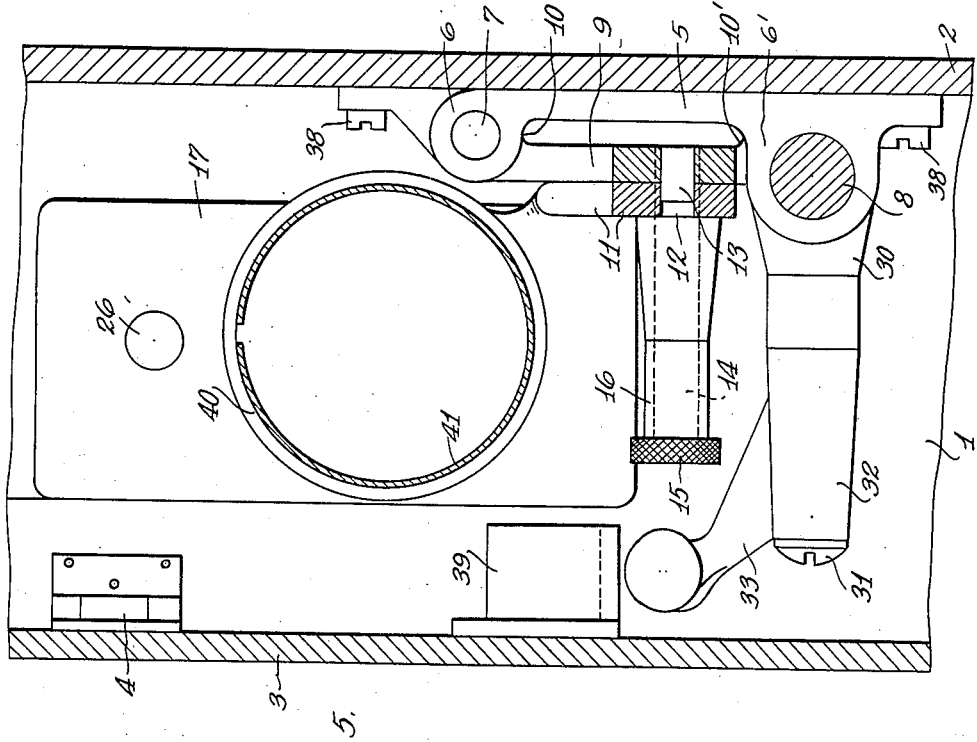
Figure 5 is a section on the line 5—5 of Figure 1.

In Figures 5 and 6 is shown one of the end walls 1 of a projector housing having a lengthwise vertical wall or partition 2 constituting the inner side wall of the film compartment and ordinarily dividing the interior of the housing 1 into a film compartment and a mechanism compartment. The outer side wall of the film compartment is constituted, at least in part, by a door section 3 hinged at 4 to the end wall 1.

To the partition 2 is secured a bracket 5 formed with bosses 6, 6' in which are secured upper and lower guide rods 7 and 8 mounted horizontally and suitably spaced from each other. On the rods 7 and 8 is slidably mounted a carriage 9 by means of bosses 10, 10', the bosses 6, 6' on each rod being located to permit ample movement of the carriage with its bosses for the purpose set forth below. On the carriage is mounted a gate base 11 located by its apertures 12 receiving dowel pins 13 extending from the carriage 9, as shown more clearly in Figure 5. The base is secured to the carriage by a screw 14 threaded into the carriage.

To the partition 2 is secured an aperture plate 16' in edgewise manner and perpendicular thereto in more or less the usual fashion. The gate base 1 carries a gate body 17 standing vertically and parallel to the aperture plate to cooperate in holding the film against the latter. The body 17 is a box-like structure having a detachable face wall 18 to enable assembly of other parts therein.

In the plate 18 are mounted a number of alined pads, each consisting of a pair of vertically disposed and horizontally spaced U-shaped members 19 having their legs 20 slidably mounted in the plate and their intermediate or main portions disposed outside the plate, as illustrated in Figure 3. The ends of each such pair, inside the base member, are joined vertically and horizontally by thin metal strips 21 suitably fastened to the ends, by means of screws 22.

A vertical rod 23 is rotatably mounted in the body 17 near one of its side walls and extends from top to bottom. Leaf springs 24 are wrapped around the rod, with one end anchored thereto and the other end engaging a horizontal strip 21 to exert an outward pressure on the pads. A fixed arm 25 extends from the rod 23 into the body 17 and has its free end engaged by a set screw 26 threaded in the back of the body, whereby the tension of the springs 24 against the pads may be adjusted.

The pads above and below the aperture are separate from these at the sides of the aperture. Thus, although the film is engaged by pads over a substantial length, a splice engaging any pair of pads will not affect the film over this entire length, but only at those pads engaged by the splice.

The aperture plate 16' has the usual film aperture 27 with vertical marginal guides 28 between which the film is adapted to run. Runways 29 are extended from the guides into the aperture and are engageable by the margins of the film when the latter is inserted between the guides. The U-shaped members of the film pads are so positioned laterally as to hold the film against the runways 29 by the adjusted tension of the springs 24, as shown in Figure 2.

A fulcrum block 30 is fixedly mounted with relation to the gate base 11 and may consist of an extension of the boss 6' which is an integral part of the bracket 5. A long screw 31 threaded into the fulcrum block has rotatably mounted thereon a toggle operating lever 33. A link 34 extends rigidly from the hub approximately half way to one of the bosses 10' of the carriage 9. A link 35 joins the last named boss to the free end of the link 34 and is pivotally attached to both parts to complete the toggle which is operated by the lever 33.

Figure 1 illustrates the locked position of the gate against the aperture plate in one of the extreme positions of the toggle. The intermediate knuckle 36 of the toggle is below the line of centers of the end knuckles and the inner end of the link 35 extends into and bears against the bottom of a slot 37 in the link 34. Thus, the gate cannot back away from the aperture plate, unless the lever 33 is actuated, and consequently no springs are needed to hold the gate in its operative position. This construction obviously simplifies the device and reduces the cost and also eliminates the undesirable slamming of the gate against the film and aperture plate resulting from the use of gate springs.

The base 11 and body 17 of the gate are readily removed from the carriage 9 and from the projector housing, when desired, by releasing the screws 15 and 31. The carriage 9 and bracket 5 may be removed by releasing the screws 38 which fasten the latter to the partition 2.

The inner surface of the door 3 carries a stop 39 which lies over the free end of the toggle operating lever 33 when the latter is in the locking position shown in Figures 1 and 5. The stop is constructed to strike against the lever when the latter is in release position, so that the door cannot be closed unless the gate is closed.

The back wall of the gate body 17 is formed with a flanged opening 40 to receive a split light tube 41 having one end grooved at 42 to receive the flange when inserted in the opening. At opposite sides of its split 43, the tube has finger pieces 44 by which it may be grasped to compress the tube for insertion or removal. The tube 41 is received telescopically in a light and lens tube 45 carried by the housing, so that the light beam is fully enclosed regardless of the movements of the gate.

At the lower end of the gate is a device for holding the film firmly against an adjacent roller or sprocket 46 (Figure 1). This device includes a back plate 47 at the ends of which are pairs of thin metal shoes 48. The back plate is supported by a screw 49 passed loosely therethrough and threaded into a lip 50 extending angularly and rearwardly from the lower end of the plate 18. The shoes of each pair engage the film at both sides of the rows of perforations therein for the sprocket teeth. The shoes are maintained in their proper spacing by spacer rods 51 passed through their ends, as shown in Figure 3.

The free end of the screw 49 carries a hollow nut 52 in which is seated a spring 53 bearing against the member 47. Through the spring, the shoes 48 hold the film under pressure against the member 46. The shoes are also capable of a universal movement, in response to variations in the thickness of the film, by reason of the loose mounting of the screw 49 in the plate 47.

The pressure of the spring is adjusted by turning the nut 52 on its threads.

Although a specific embodiment of the invention has been illustrated and described, it will be understood that various alterations in the details of construction may be made without departing from the scope of the invention, as indicated by the appended claims.

What I claim is:

1. A film gate comprising a body, a vertical series of pads slidably mounted therein, a vertical rod journaled in said body, horizontal springs anchored directly to said rod and engaging said pads, and means for adjusting the angular position of said rod against the tension of said springs, whereby to adjust said tension.

2. A film gate comprising a body, a vertical series of pads slidably mounted therein, a vertical rod journaled in said body, horizontal springs anchored directly to said rod and engaging said pads, an arm extending from said rod, a set screw threaded in said body and engageable with said arm to turn the same and said rod against the tension of said springs, whereby to adjust said tension.

3. A film gate comprising a body, laterally spaced U-shaped members disposed vertically substantially outside of said body and having their legs extending through a wall of said body, strips joining the ends of said legs, a vertical rod journaled in said body, horizontal springs anchored directly to said rod and engaging certion of said strips, and means for adjusting the angular position of said rod against the tension of said springs, whereby to adjust said tension.

4. A film gate comprising a body, pairs of laterally spaced U-shaped members disposed vertically substantially outside of said body and having their legs extending through a wall of said body, strips joining the ends of the legs of each pair, a vertical rod journaled in said body, horizontal springs anchored directly to said rod and engaging certain of said strips, and means for adjusting the angular position of said rod against the tension of said springs, whereby to adjust said tension.

5. A film gate comprising a body, pairs of laterally spaced U-shaped members disposed vertically substantially outside of said body and having their legs extending through a wall of said body, strips joining the ends of the legs of each pair, a vertical rod journaled in said body, horizontal springs anchored directly to said rod and engaging certain of said strips, an arm extending from said rod, a set screw threaded in said body and engageable with said arm to turn the same and said rod against the tension of said springs, whereby to adjust said tension.

6. A film gate comprising a body, pairs of laterally spaced U-shaped members disposed substantially outside of said body and having their legs extending through a wall of said body, strips joining the ends of the legs of each pair, a rod journaled in said body, springs anchored to said rod and engaging certain of said strips, one of said pairs being disposed at the sides of the projection aperture in the gate, and the other pairs being disposed above and below the first named pair, and means for adjusting the angular position of said rod against the tension of said springs whereby to adjust said tension.

KARL BRENKERT.